Aug. 14, 1934.    T. FOSTER    1,970,297
FEEDING HEADS FOR RECIPROCATING OR JIGGING CONVEYERS
Filed April 13, 1931    5 Sheets-Sheet 1
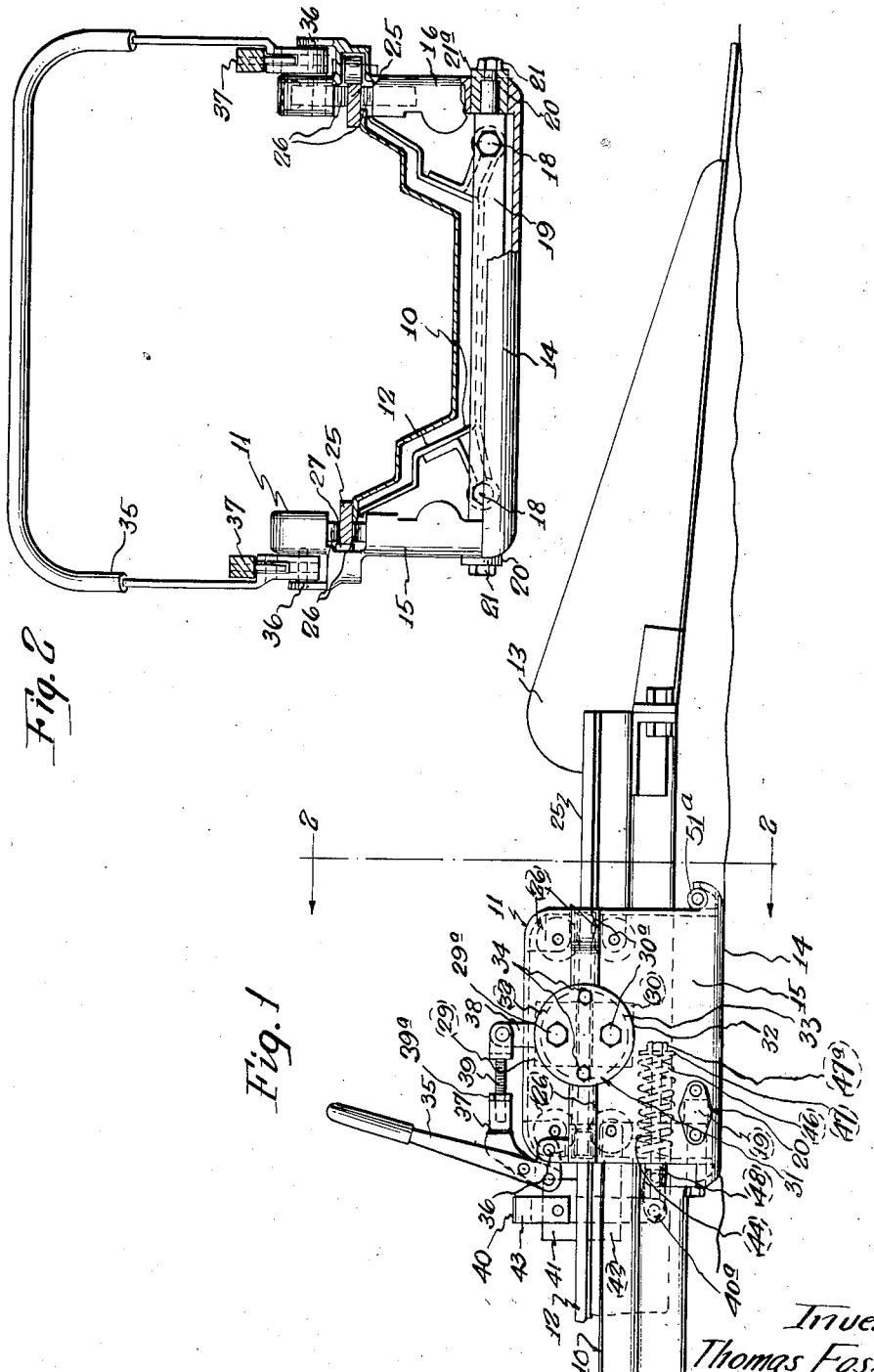

Aug. 14, 1934.   T. FOSTER   1,970,297
FEEDING HEADS FOR RECIPROCATING OR JIGGING CONVEYERS
Filed April 13, 1931   5 Sheets-Sheet 2
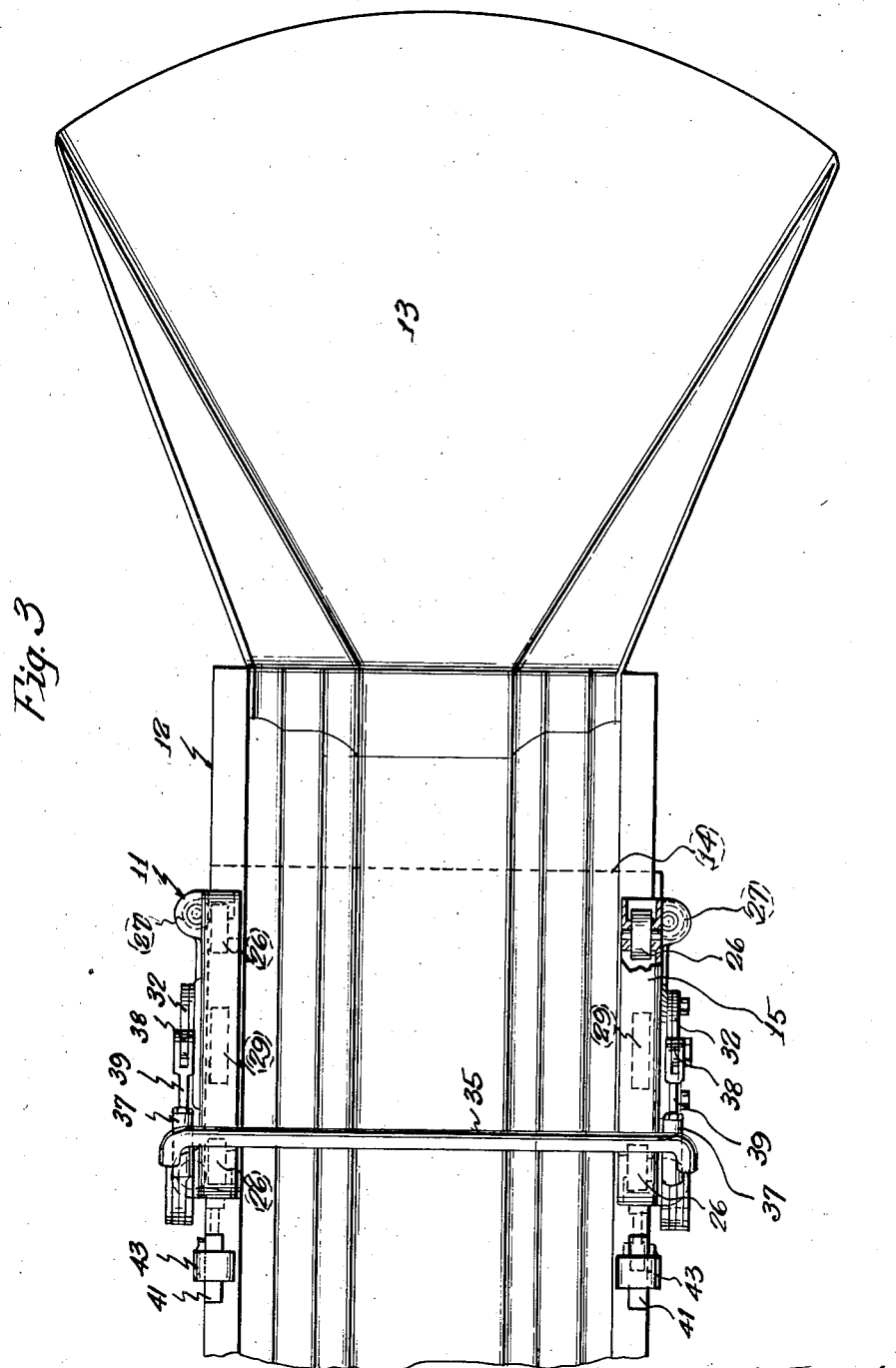
Inventor
Thomas Foster
Clarence F. Powell
Attorney

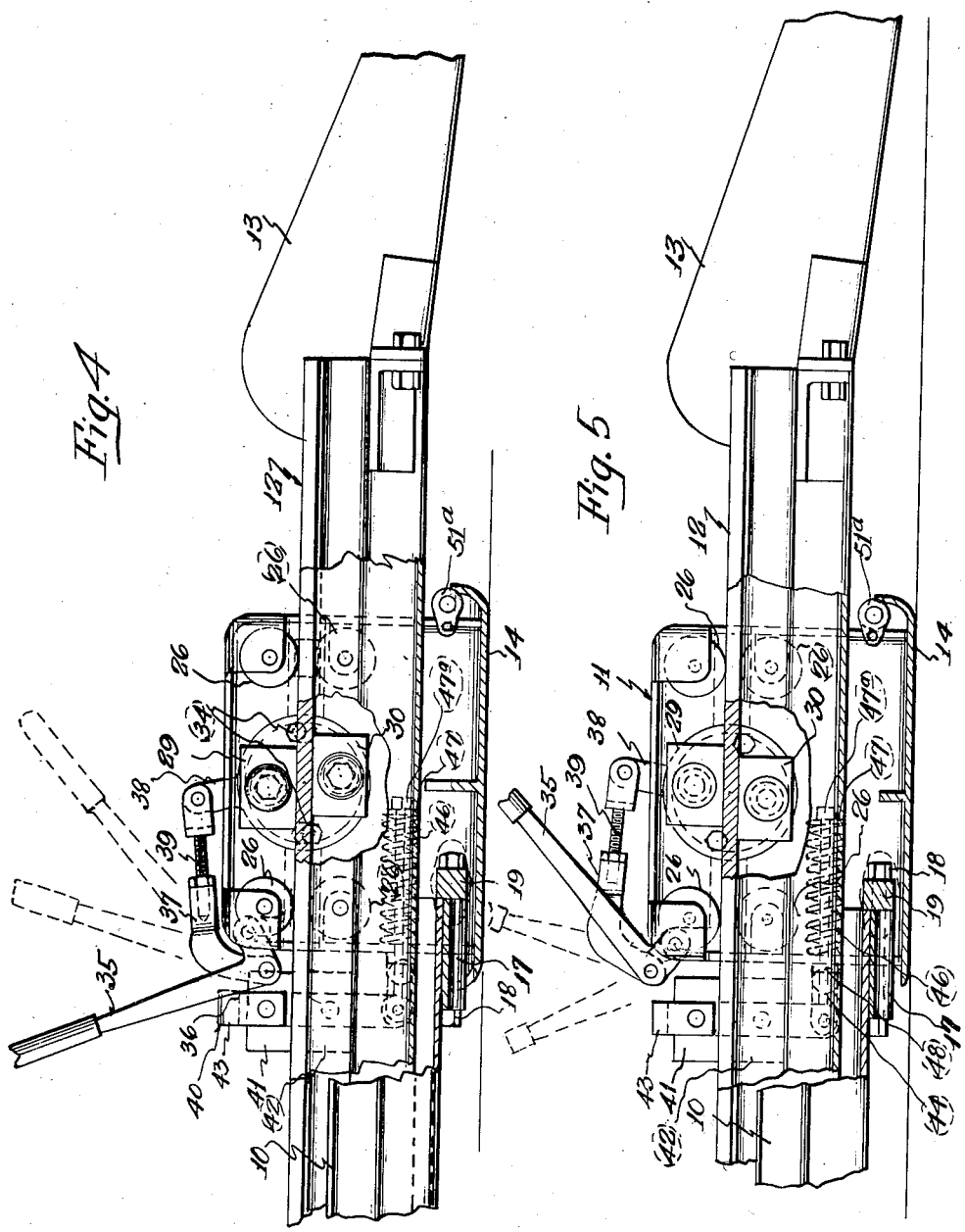

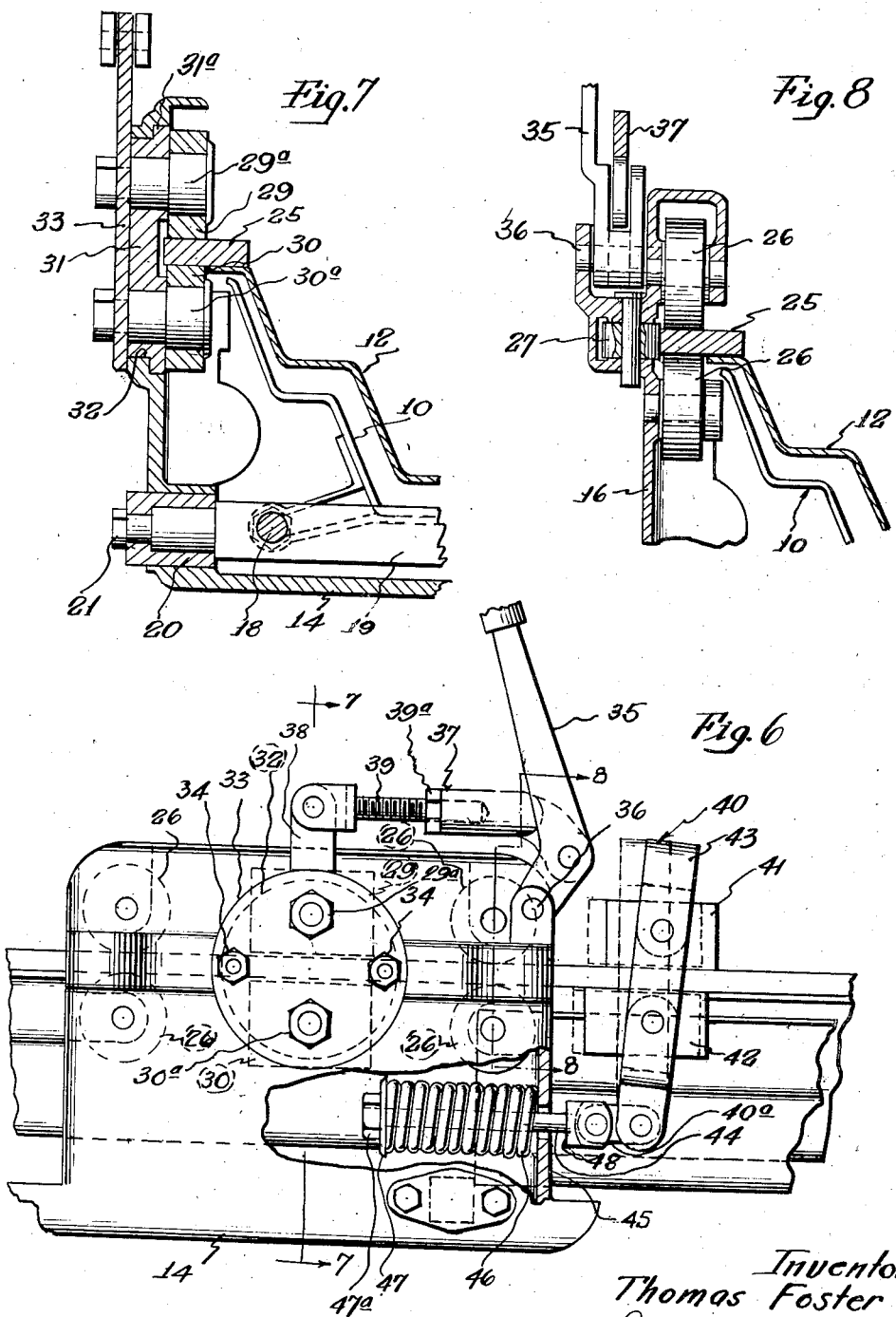

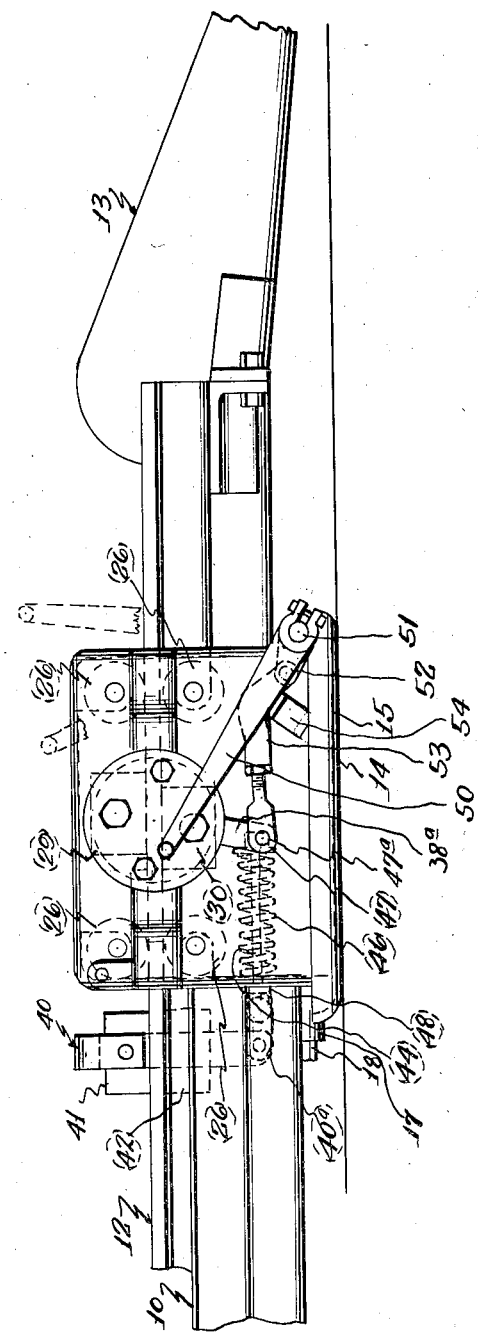

Patented Aug. 14, 1934

1,970,297

UNITED STATES PATENT OFFICE 1,970,297

FEEDING HEADS FOR RECIPROCATING OR JIGGING CONVEYERS

Thomas Foster, Winton, Wyo., assignor to Goodman Manufacturing Company, Chicago, Ill., a corporation of Illinois Application April 13, 1931, Serial No. 529,661

9 Claims. (Cl. 198—220)

This invention relates to improvements in feeding heads for reciprocating or jigging conveyers of the type used for gathering and transporting loose material such as coal, rock or the like.

More specifically my invention relates to improvements in construction of devices attached to the loading end of a reciprocating conveyer and which include manually operated means for controlling the extension or retraction of a telescoping trough section and gathering shovel at the end of the conveyer. As heretofore employed, relative movement between the main conveyer and the telescoping trough and gathering shovel has usually been controlled through friction devices carried by the feeding head and engageable and disengageable with a telescoping trough section at will during such periods of the forward or rearward stroke of the reciprocating conveyer as to cause said telescoping section and its shovel to be extended or retracted as required.

The object of the present invention is to provide an improved and simplified construction of loading head and friction devices carried thereby whereby the digging and loading operation of the shovel may be easily controlled.

A further object of the invention is to provide a flexible connection between the main reciprocating conveyer and the loader head, so as to increase the efficiency of operation of the device as will hereafter more fully appear.

The invention may best be understood by reference to the accompanying drawings, in which Figure 1 is a view in side elevation of a feeding head attached to the forward end of a reciprocating conveyer showing a portion of the extensible trough and digging shovel in retracted and unlocked position within said head;

Figure 2 is a transverse section taken on line 2—2 of Figure 1, but drawn to a slightly larger scale;

Figure 3 is a top plan view of the apparatus shown in Figures 1 and 2, but drawn to the same scale as Figure 2;

Figure 4 is an enlarged side view of the apparatus shown in Figure 1, but with parts broken away to show details of construction of the friction clamping mechanism and showing said clamping mechanism in a position in which the friction clamps are engaged with the extensible trough;

Figure 5 is a view similar to Figure 4, but showing the clamping blocks in another position in which they are frictionally engaged with the extensible trough;

Figure 6 is an enlarged detail view taken from the side of the loading head opposite that shown in Figure 1 with parts broken away to show the arrangement of the tail block mounting;

Figures 7 and 8 are detail sections taken on lines 7—7 and 8—8 of Figure 6; and

Figure 9 is a view in side elevation of a modified form of control means for the feeding head for use where overhead clearance is limited.

Referring now to details of construction of the embodiment of my invention illustrated in the drawings, the main elements thereof consist of a reciprocating conveyer trough section 10, a feeding head 11, and an extensible trough section 12 having a flared gathering shovel 13 integrally carried at its forward end in the usual manner.

The feeding head has a shoe 14 supported for sliding engagement on the ground or floor upon which the entire apparatus rests, and is provided with two upstanding side walls 15, 16.

The feeding head is suitably connected for reciprocating or jigging action with the main conveyer trough, preferably by means of a pivotal connection affording limited vertical rocking movement therebetween. In the form shown, the end of the main conveyer trough section 10 is provided on its under face with a pair of laterally spaced, elongated eyes 17, 17 of the form usually employed in connecting adjacent trough sections together, but in the present instance the connecting bolts 18, 18 extend through a cross bar 19 which is pivotally mounted at opposite ends in journal supports 20, 20 carried by side walls 15, 16 of the loading head. Said journal supports may, for convenience, be detachably mounted in said side plates as by bolts 21, 21 extending through lugs 21a, 21a on the outer faces of each of the side walls 15 and 16, as shown in Figures 2, 6 and 7. With the pivotal construction just described, the feeding head is given greater flexibility in adjusting itself to the incline or angle of the floor over which it slides, and especially permits the forward end of the gathering shovel 13 to be directed along the floor, or base of the pile of material to be loaded, which feature is of especial importance in a devce of this character, in which much of the success of operation depends upon providing means for temporarily restraining movement of said shovel during certain periods of movement of the conveyer trough and the loading head. In practice, it has been demonstrated that the forward feeding or loading action is best accomplished when the shovel is initially directed along the floor of the mine so as to quickly dig into the pile of loose material, the resistance of which assists and tends to hold the extensible trough section stationary relative to the reciprocating main conveyer during the retractive movement of the latter.

The extensible trough section 12 is partially nested within the forward end of the main conveyer trough section 10, and is provided with laterally extending plates 25, 25 along each side thereof which are engaged by a plurality of vertically disposed roller guides 26, 26 and horizontally disposed roller guides 27, 27 mounted on the side walls 15, 16 of the loading head so as to support said extensible trough section for longitudinal sliding movement relative to said head.

The friction braking means for manually controlling the relative movement between the extensible trough and the feeding head comprises two sets of friction blocks, each set consisting of blocks 29, 30 mounted above and below one of the laterally extending plates 25 at the sides of the extensible trough. The construction of each set being similar, a description of one set will apply to both.

The blocks 29 and 30 may be of any suitable friction material, as for instance, wood. They are pivotally mounted on pins 29a and 30a, carried by a bearing disc 31 rotatably supported in an enlarged bearing 32 formed centrally of its respective side wall; as, for instance, side wall 16 as seen in Figure 7. Said disc is provided with a flanged portion 31a engaging the inner face of its bearing, and has a plate 33 fixed to its outer face as by bolts 34, 34 so as to hold said disc in its bearing.

The two discs 31, 31, rotatable in the opposite walls 15, 16 as described, are arranged for manual operation by means of a bail handle 35, pivotally mounted on pins 36, 36 at the upper rear corners of said side walls, and connected to each of said discs through links 37, 37 and levers 38, 38, which in the form shown are integral extensions of plates 33, 33.

The links 37 are each preferably adjustable in length by screw 39 and lock nut 39a.

The arrangement is such that when each of the discs 31 is rotated into position shown in Figures 1 and 6, the two sets of blocks 29 and 30 are moved out of frictional engagement with the adjacent plates 25 of the extensible trough, so that the latter is free to move either forwardly or rearwardly, so far as said blocks are concerned. By rocking the bail 35 rearwardly as seen in full lines in Figure 4, each pair of blocks 29 and 30 are rotated so that the lower block is in advance of the upper block, and said blocks are drawn toward each other so as to clamp the plate 25 in frictional engagement therebetween, with sufficient pressure under ordinary circumstances to lock the extensible trough section 12 relative to the feeding head 11. The arrangement is such that when the bail 35 is depressed to the extreme rearward position shown, the point of pivotal connection between the link 37 and the bail passes over a dead center line including the bail pivot and the point of pivotal connection of the link 37 and lever 38. The mechanism therefore will be maintained in locked position until positively released by swinging the bail 35 upwardly.

The blocks may also be frictionally engaged by rotating the plates 33 forwardly, with the bail 35 in position shown in Figure 5, but in this case the lever mechanism cannot be locked over dead center as described in connection with the arrangement shown in Figure 4.

In conjunction with the manual control means above described, I find it advantageous, under certain conditions as will more fully appear, to provide an auxiliary friction device at the rear of the loading head, as indicated generally at 40, and including a pair of friction blocks 41, 42 mounted on a carrier 43 pivotally supported through link 40a on a rod 44 passing longitudinally through an upright plane 45 extending inwardly from one of the side walls 16. The rod 44 has a coil spring 46 thereon, interposed between said flange and a washer 47 and nut 47a at the forward end of said rod. Said spring is normally maintained under slight compression by a stop 48 at the rear face of said flange, but the rod is permitted relative rearward movement against the tension of said spring, under conditions of operation as will now be described.

When the feeding head is reciprocating or jigging in the usual manner, and the bail 35 is held in either locked or clamping position, as shown in Figures 4 or 5, the extensible trough 12 and shovel 13 are reciprocated in unison with said head, and any material which is placed along the shovel, extensible trough or main conveyer trough will be moved rearwardly away from the loading end, due to the "jigging" action peculiar to devices of this character.

When it is desired to extend the shovel 13 so as to reach further in advance of the feeding head, the bail 35 is moved toward the intermediate or released position shown in Figure 1, at the instant the conveyer is at the forwardmost limit of its stroke, or has started its retractive movement. When the frictional engagement is thus released, the shovel and loading trough has a tendency to remain stationary relative to the loading head as the latter is moved rearwardly. As a result, when the loading head reaches the end of its retracted movement, the distance between the shovel and said head has been increased. The bail 35 is then moved either forwardly or rearwardly to a locking position, and the shovel will then be advanced with the next forward stroke of the loading head into a new or extended position.

The extensible trough and shovel may be retracted by operating the bail handle 35 to release the trough during the forward stroke, and clamping the trough during the rearward stroke.

Referring now to the operation of the auxiliary friction device indicated generally at 40, it will be seen that said device works more or less automatically in conjunction with the hand operated friction blocks 29, 30 to cause a more positive forward feeding action of the extensible trough. This is particularly designed for use under conditions in which the loading apparatus is operating on ascending grades, and where due to gravity the extensible trough has a tendency to drop back with the loading head during its retractive movement even though the extensible trough is manually released from frictional engagement with the head at the proper time.

It will be seen by reference to Figure 6 that the friction blocks 41, 42 and their carrier 43 will normally be free to oscillate about the point of pivotal connection with the rod 44. If during the beginning of the forward stroke the hand operated blocks 29, 30 are moved into released position, the carrier 43 automatically assumes a rearwardly inclined or locking position as indicated in full lines in Figure 6 so that the blocks 41 and 42 carry the extensible trough forwardly with the loading head. While the blocks 41 and 42 are engaging the extensible trough, the latter may move rearwardly slightly relative to the feeding head, due to gravity, inertia of said trough, or obstruction of material with which the shovel is engaged. Further forward movement of the head will cause rearward movement of the rod 44 and corresponding compression of the spring 46. When the spring is compressed sufficiently the extensible trough is carried forward in unison with the main conveyer through the remainder of the forward stroke, but with the spring 46 under considerable compression. When the conveyer reaches the end of its forward stroke and starts its return stroke, the spring 46 gives an additional forward impulse to the extensible trough 12 so as to feed it positively forward against gravity relative to the feeding head a distance substantially greater than the amount of compression of said spring. When the stop 48 on the rod 44 comes into engagement with the flange, the carrier 43 is thrown forwardly out of locking position with the result that the trough is given a positive forward throw relative to the loading head, and thus insure its forward extension relative to the loading head. When it is desired to retract the trough, or feed it in the normal manner without employing the tail blocks, the carrier 43 may be held in upright, inoperative position by the operator.

It will now be understood that the auxiliary friction device just described, cooperates to insure forward extension of the trough in conjunction with the manually operated friction blocks 29, 30, when the apparatus is working upon such an up grade that gravity might otherwise make it impossible to feed the shovel forwardly.

The modified form of control means shown in Figure 9 is designed for use where overhead clearance is limited. In this form the manual control bail 35, which extends across the top of the device, is superseded by a pair of levers 50, 50 mounted on a shaft 51 extending transversely of the feeding head at the front end thereof and closely adjacent the floor. The shaft 51 is suitably journaled for rotation; as, for instance, by brackets 51a, 51a (see Figs. 1, 4 and 5) provided for this purpose. The levers 50 are mounted at opposite ends of the shaft 51 and are arranged to swing in a vertical plane outside of the side walls 15 and 16 and the parts carried thereby. Adjacent each of the levers 50 is an arm 52 fixed on shaft 51 and having a link 53 pivotally connected on its outer end, which link forms a connection between said arm and a lever 38a projecting downwardly from the disc 31. It will be seen by a comparison of Figures 9 and 1 that the disc 31 is merely rotated into an inverted position, the lever 38 in Figure 1 corresponding with the lever 38a in Figure 9.

Similarly the link 53 corresponds to the link 37 in Figure 1.

With the control mechanism arranged as shown in full lines in Figure 9, the friction blocks 29 and 30 are rotated into locked or clamping position with the lever 50 engaging stop 54. The arrangement of the arm 52 and connecting link 53 is such that when the lever 50 is depressed to the position shown, the point of pivotal connection between said link and arm passes over a dead center line including the axis of shaft 51 and the point of pivotal connection of the link 53 and lever 38a. The mechanism will therefore be maintained in locked position until positively released by moving the lever 50 upwardly.

The blocks 29 and 30 are moved into unlocked or released position by swinging the lever upwardly and forwardly so that their pivotal points of connection to the disc 31 are in vertical alignment with each other. The blocks may also be locked by swinging the levers 50 still farther forwardly from the released position when under most circumstances it is preferable to operate the control levers by swinging them rearwardly from the released position.

Although I have herein shown and described one form in which my invention may be embodied, it will be understood that the construction and arrangement of the various parts may be altered or changed without departing from the spirit or scope of the invention. Furthermore, I do not wish to be construed as limiting myself to the particular embodiment illustrated, excepting as it may be limited in the appended claims.

I claim as my invention:

1. In a feeding head for a jigging conveyer, and in combination with an extensible trough, an elongated plate carried by said trough, a pair of friction devices pivotally movable about a fixed axis on said head included within the vertical boundaries of said plate, and means for oscillating said friction devices into and out of clamping position on opposite sides of said plate.

2. In combination with a jigging conveyer, an extensible trough, a feeding head having a pair of laterally spaced upright walls, a pair of disks each rotatably mounted in one of said upright walls about a common transverse axis, each of said disks having a pair of oppositely disposed friction blocks disposed above and below a portion of said extensible trough, and means for rotating said disks to bring said blocks into and out of frictional engagement with said trough.

3. In combination with a jigging conveyer, an extensible trough including a pair of laterally extending plates, a feeding head having a pair of laterally spaced upright walls, longitudinally spaced guide means on said walls slidably supporting said trough, a pair of disks each rotatably mounted in one of said upright walls about a common transverse axis intersecting the vertical limits of said trough plates, each of said disks having two friction blocks disposed above and below said trough plate, and means for rotating said disks to bring said blocks into and out of frictional engagement with said trough.

4. In a feeding head for a jigging conveyer, and in combination with an extensible trough, manually operated means on said head for controlling the extension of said trough, and an auxiliary friction device comprising an upright carrier having a pair of friction blocks disposed above and below a portion of said extensible trough, a horizontally disposed supporting member pivotally connected to said carrier below said blocks and supported for longitudinal movement relative to said head and extending from said carrier through an upright abutment on said head, and tension means interposed between said abutment and the end of said supporting member opposite to its point of pivotal connection to said carrier.

5. In combination with a jigging conveyer, including a conveyer trough, a feeding head adapted to rest on and slide along the ground, an extensible trough carried by said feeding head and having a forward end adapted to rest on and be slidably moved along the ground, means on said feeding head for controlling extension of said trough, and a pivotal connection between said head and the forward end of said conveyer trough permitting bodily vertical rocking movement of said extensible trough and feeding head relative to said conveyer trough.

6. In a feeding head for a jigging conveyer, and in combination with an extensible trough, an elongated plate carried by said trough, a rotatable disk on said head having a pair of oppositely disposed friction blocks thereon disposed above and below said elongated plate and having engagement therewith, said disk being rotatable about a fixed axis disposed intermediate said friction blocks, and means for rotating said disk to bring said blocks into and out of frictional engagement with said elongated plate.

7. In combination with a jigging conveyer, a conveyer trough, an extensible trough adapted to be nested within or extended from said conveyer trough, a feeding head, means on said feeding head for controlling extension of said trough, and a pivotal connection between said head and said jigging conveyer permitting bodily vertical rocking movement of said feeding head and extensible trough relative to said conveyer comprising a transversely extending pivotally movable bar connecting the forward end of said conveyer trough with said feeding head.

8. In combination with a jigging conveyer, a conveyer trough, an extensible trough adapted to be nested within or extended from said conveyer trough, a feeding head, means on said feeding head for controlling extension of said trough, and a pivotal connection between said head and said jigging conveyer permitting bodily vertical rocking movement of said feeding head and extensible trough relative to said conveyer comprising a transversely extending bar having fixed connection with the forward end of said conveyer trough and pivotal connection with said feeding head at a point disposed beneath said extensible trough.

9. In combination with a jigging conveyer, a conveyer trough, an extensible trough adapted to be nested in or extended from said conveyer trough and having a forward end adapted to rest on and be slidably moved along the ground, a feeding head, means on said head for controlling extension of said trough, and a connection between said head and said jigging conveyer permitting vertical rocking movement of said feeding head relative to said conveyer comprising a rocking member connecting the forward end of said trough with said feeder head.

THOMAS FOSTER.